United States Patent
Zhang et al.

(10) Patent No.: US 12,368,403 B2
(45) Date of Patent: Jul. 22, 2025

(54) MOTOR CONTROLLER AND BLDC MOTOR COMPRISING THE SAME

(71) Applicant: Zhongshan Broad-Ocean Motor Co., Ltd., Zhongshan (CN)

(72) Inventors: Xiansheng Zhang, Zhongshan (CN); Wenqing Bian, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 156 days.

(21) Appl. No.: 18/387,050

(22) Filed: Nov. 5, 2023

(65) Prior Publication Data

US 2024/0063742 A1 Feb. 22, 2024

Related U.S. Application Data

(63) Continuation-in-part of application No. PCT/CN2022/079834, filed on Mar. 9, 2022.

(30) Foreign Application Priority Data

Aug. 12, 2021 (CN) .......................... 202121881887.1

(51) Int. Cl.
*H02M 7/539* (2006.01)
*H02P 23/14* (2006.01)
(Continued)

(52) U.S. Cl.
CPC .............. *H02P 23/14* (2013.01); *H02P 25/03* (2016.02); *H02P 27/06* (2013.01)

(58) Field of Classification Search
CPC .......... H02P 23/14; H02P 25/03; H02P 27/06; H02P 6/16; H02P 6/24; H02P 6/20
See application file for complete search history.

(56) References Cited

U.S. PATENT DOCUMENTS

| | | | |
|---|---|---|---|
| 2015/0001021 A1* | 1/2015 | Matsumoto | B60L 7/22 |
| | | | 191/4 |
| 2021/0270363 A1 | 9/2021 | Tomita | |
| 2022/0360085 A1* | 11/2022 | Kadam | H02J 3/32 |

FOREIGN PATENT DOCUMENTS

| | | |
|---|---|---|
| CN | 105952889 A | 9/2016 |
| CN | 215734083 U | 2/2022 |

(Continued)

OTHER PUBLICATIONS

Zhenhai Shi, Wipe Failure of Chang'an Mazda Axela, Auto Maintenance & Repair, Feb. 1, 2016, p. 52-54, vol. 2, China Automobile Maintenance Industry Association, Nanjing, China.

*Primary Examiner* — Muhammad S Islam
(74) *Attorney, Agent, or Firm* — MATTHIAS SCHOLL P.C.; Matthias Scholl

(57) ABSTRACT

A motor controller includes a tap position selection circuit, a micro control unit (MCU), and an inverter circuit. The tap position selection circuit is configured to process a plurality of tap position signals transmit processed tap position signals to the MCU. The MCU is configured to output signals to control the operation of the inverter circuit. The inverter circuit includes an output terminal connected to a plurality of coil windings of a stator module of a motor. The tap position selection circuit includes a plurality of first signal input circuits for motor start and a plurality of second signal input circuits for motor stop; each tap position signal is split into a first part and a second part. The first part is input into one first signal input circuit for motor start and the second part is input into one second signal input circuit for motor stop.

9 Claims, 6 Drawing Sheets

(51) Int. Cl.
*H02P 25/03* (2016.01)
*H02P 27/06* (2006.01)

(56) References Cited

FOREIGN PATENT DOCUMENTS

| CN | 216134439 U | 3/2022 |
|----|-------------|--------|
| JP | 2015033151 A | 2/2015 |

* cited by examiner

MOTOR CONTROLLER AND BLDC MOTOR COMPRISING THE SAME

CROSS-REFERENCE TO RELAYED APPLICATIONS

This application is a continuation-in-part of International Patent Application No. PCT/CN2022/079834 with an international filing date of Mar. 9, 2022, designating the United States, now pending, and further claims foreign priority benefits to Chinese Patent Application No. 202121881887.1 filed Aug. 12, 2021. The contents of all of the aforementioned applications, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to a motor controller and a brushless direct current (BLDC) motor comprising the same.

As shown in FIG. 1, a conventional HVAC system (i.e., heating, ventilation, and air conditioning system) includes a mainboard that receives multiple relay signals (0-24 VAC) to control the operation of the BLDC motor in different modes such as heating, cooling, ventilation, dehumidification, etc. A 24 VAC signal is susceptible to fluctuations or interference of power grids. In severe instances, the fluctuations and inference may prevent the activation of the intended mode or mistakenly trigger an incorrect mode, resulting in the disability of air conditioning functionality.

SUMMARY

To solve the aforesaid problems, the first objective of the disclosure is to provide a motor controller.

The motor controller comprises a tap position selection circuit, a micro control unit (MCU), and an inverter circuit. The tap position selection circuit is configured to process a plurality of tap position signals transmit processed tap position signals to the MCU; the MCU is configured to output signals to control the operation of the inverter circuit; the inverter circuit comprises an output terminal connected to a plurality of coil windings of a stator module of a motor; the tap position selection circuit comprises a plurality of first signal input circuits for motor start and a plurality of second signal input circuits for motor stop; each tap position signal M is split into a first part and a second part; the first part is input into one first signal input circuit for motor start and the second part is input into one second signal input circuit for motor stop; and the first signal input circuit for motor start and the second signal input circuit for motor stop output two level signals, IO-a and IO-b, respectively, to the MCU, and the MCU controls a start or stop state of the motor based on a magnitude of the two level signals, IO-a and IO-b.

In a class of this embodiment, the first signal input circuit for motor start has a first threshold voltage U1, and the second signal input circuit for motor stop has a second threshold voltage U2; a potential difference is present between the first threshold voltage U1 and the second threshold voltage U2. When the voltage of the tap position signal M is greater than the first threshold voltage U1, the level signal IO-a is high-level. When the voltage of the tap position signal M is less than the first threshold voltage U1, the level signal IO-a is low-level. Similarly, when the voltage of the tap position signal M is greater than the second threshold voltage U2, the level signal IO-b is high-level, and when the voltage value of the tap position signal M is less than the second threshold voltage U2, the level signal IO-b is low-level.

In a class of this embodiment, the first signal input circuit for motor start comprises a resistor R3, a capacitor C5, a diode D1, a voltage regulator ZD1, a transistor Q1, an optocoupler chip U10, a capacitor C1, and a resistor R2; the tap position signal M is transmitted to a first input pin 1a of the optocoupler chip U10; the transistor Q1 comprises a first collector, a first emitter, and a first base; the first collector of the transistor Q1 is connected to a second input pin 2a of the optocoupler chip U10, and the first emitter of the transistor Q1 is grounded; one end of the resistor R3 is in series with one end of the voltage regulator ZD1, and the other end of the voltage regulator ZD1 is connected to the first base of the transistor Q1; the other end of the resistor R3 is in series with one end of the voltage regulator ZD1, and the other end of the voltage regulator ZD1 is connected to one end of the capacitor C5; the other end of the capacitor C5 is grounded; the tap position signal M is transmitted to the one end of the capacitor C5 through the diode D1; the capacitor C1 and the resistor R2 are connected in parallel; one end of the parallel combination is connected to an output pin 3a of the optocoupler chip U10, and the other end of the parallel combination is grounded.

In a class of this embodiment, a magnitude of the first threshold voltage U1 is determined by the resistor R3 and the voltage regulator ZD1. When the diode D1 receives the tap position signal M, the capacitor C5 is charged. When the terminal voltage of the capacitor C5 exceeds the first threshold voltage U1, the transistor Q1 switches on, so that a connection among the first input pin 1a of the optocoupler chip U10, the second input pin 2a of the optocoupler chip U10, and the transistor Q1 is established, allowing the optocoupler chip U10 to output the level signal IO-a at high state. When the terminal voltage of the capacitor C5 is lower than the first threshold voltage U1, the transistor Q1 switches off, and no connection is established among the first input pin 1a of the optocoupler chip U10, the second input pin 2a of the optocoupler chip U10, and the transistor Q1; as a result, the optocoupler chip U10 outputs the level signal IO-a at low state.

In a class of this embodiment, the second signal input circuit for motor stop comprises a resistor R10, a capacitor C6, a diode D3, a voltage regulator ZD2, a transistor Q2, an optocoupler chip U20, a capacitor C3, and a resistor R9; the tap position signal M is transmitted to the first input pin 1b of the optocoupler chip U20; the transistor Q2 comprises a second collector, a second emitter, and a second base; the second collector of the transistor Q2 is connected to the second input pin 2b of the optocoupler chip U20, and the second emitter of the transistor Q2 is grounded; one end of the resistor R10 is in series with one end of the voltage regulator ZD2, and the other end of the voltage regulator ZD2 is connected to the second base of the transistor Q2; the other end of the resistor R10 is connected to one end of the capacitor C6, and the other end of the capacitor C6 is grounded; the tap position signal M is transmitted to the one end of the capacitor C6 through the diode D3; the capacitor C3 and the resistor R9 are connected in parallel; one end of the parallel combination is connected to the output pin 3b of the optocoupler chip U20, and the other end of the parallel combination is grounded.

In a class of this embodiment, the magnitude of the second threshold voltage U2 is determined by the resistor R10 and the voltage regulator ZD2. When the diode D3 receives the tap position signal M, the capacitor C6 is charged. When the terminal voltage of the capacitor C6 exceeds the second threshold voltage U2, the transistor Q2 switches on, so that a connection among the first input pin 1b of the optocoupler chip U20, the second input pin 2b of the optocoupler chip U20, and the transistor Q2 is established, allowing the optocoupler chip U20 to output the level signal IO-b at high state. When the terminal voltage of the capacitor C6 is lower than the second threshold voltage U2, the transistor Q2 switches off, and no connection is established among the first input pin 1b of the optocoupler chip U20, the second input pin 2b of the optocoupler chip U20, and the transistor Q2; as a result, the optocoupler chip U20 outputs the level signal IO-b at low state.

In a class of this embodiment, the first threshold voltage U1 is greater than the second threshold voltage U2.

In a class of this embodiment, the tap position signals comprise two tap position signals, M1 and M2.

The second objective of the disclosure is to provide a BLDC motor; the BLDC motor comprises a motor and the motor controller; the motor comprises a stator, a rotor, and a housing.

The following advantages are associated with the disclosure.

Each tap position signal M is split and input into one of the first signal input circuits for motor start and one of the second signal input circuits for motor stop. Subsequently, the first signal input circuit for motor start and the second signal input circuit for motor stop output two level signals, IO-a and IO-b, respectively. The first signal input circuit for motor start has a first threshold voltage U1, and the second signal input circuit for motor stop has a second threshold voltage U2. A potential difference is present between the first threshold voltage U1 and the second threshold voltage U2. The MCU controls the start or stop state of the motor based on the magnitude of the two level signals, IO-a and IO-b. Due to a hysteresis potential difference between the first threshold voltage U1 and U2, a hysteresis voltage is present for switching the motor between ON and OFF states, thereby enhancing the anti-interference capability of the motor controller. The MCU monitors the level status of two IO ports corresponding to each tap position signal, so as to determine a voltage range within which the actual voltage value of each tap position signal falls. The monitoring process allows for precise control of the motor controller, ensuring accurate starting and stopping at a voltage threshold. As a result, the overall reliability of the motor controller is improved.

DETAILED DESCRIPTION

Figure 1:
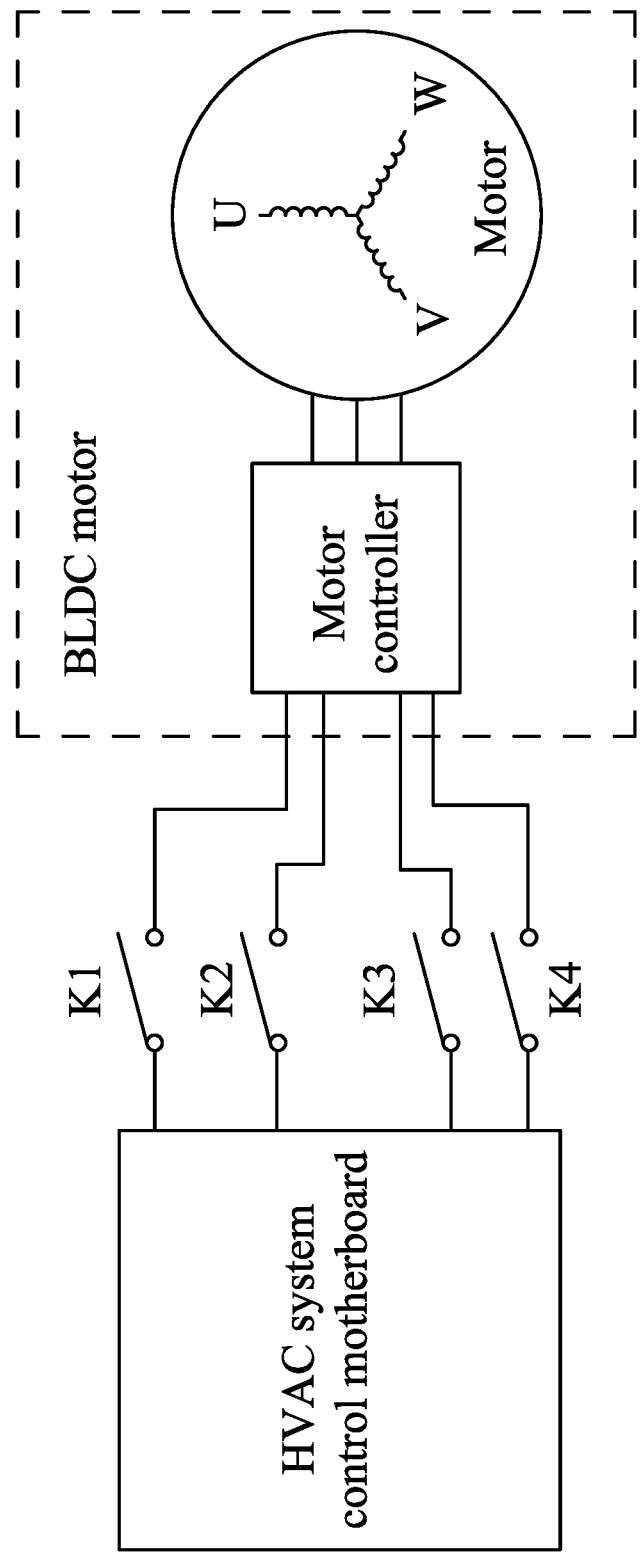
FIG. 1 is a block diagram of a connection between a HVAC system between a BLDC motor in the related art.

To further illustrate the disclosure, embodiments detailing a motor controller and a BLDC motor comprising the same are described below. It should be noted that the following embodiments are intended to describe and not to limit the disclosure.

Example 1

As shown in FIGS. 2, 3, 4, and 5, the example provides a motor controller for controlling the operation of a motor. The motor controller comprises a tap position selection circuit, a micro control unit (MCU), and an inverter circuit. Tap position signals are processed by the tap position selection circuit and transmitted to the MCU. The MCU is configured to output signals to control the operation of the inverter circuit. The motor comprises a stator module wrapped with a plurality of coil windings. The inverter circuit comprises an output terminal connected to the plurality of coil windings. Specifically, the tap position selection circuit comprises a plurality of first signal input circuits for motor start and a plurality of second signal input circuits for motor stop. Each tap position signal M is split and input into one first signal input circuit for motor start and one second signal input circuit for motor stop. Subsequently, the first signal input circuit for motor start and the second signal input circuit for motor stop output two level signals, IO-a and IO-b, respectively, to the MCU. The MCU controls the start or stop state of the motor based on the magnitude of the two level signals, IO-a and IO-b.

The first signal input circuit for motor start has a first threshold voltage U1, and the second signal input circuit for motor stop has a second threshold voltage U2. A potential difference is present between the first threshold voltage U1 and the second threshold voltage U2. When the voltage of the tap position signal M is greater than the first threshold voltage U1, the level signal IO-a is high-level. When the voltage of the tap position signal M is less than the first threshold voltage U1, the level signal IO-a is low-level. Similarly, when the voltage of the tap position signal M is greater than the second threshold voltage U2, the level signal IO-b is high-level, and when the voltage value of the tap position signal M is less than the second threshold voltage U2, the level signal IO-b is low-level.

The first signal input circuit for motor start comprises a resistor R3, a capacitor C5, a diode D1, a voltage regulator ZD1, a transistor Q1, an optocoupler chip U10, a capacitor C1, and a resistor R2. The tap position signal M is transmitted to the first input pin 1a of the optocoupler chip U10. The transistor Q1 comprises a collector, an emitter, and a base. The collector of the transistor Q1 is connected to the second input pin 2a of the optocoupler chip U10, and the emitter of the transistor Q1 is grounded. One end of the resistor R3 is in series with one end of the voltage regulator ZD1, and the other end of the voltage regulator ZD1 is connected to the base of transistor Q1. The other end of resistor R3 is in series with one end of the voltage regulator ZD1, and the other end of the voltage regulator ZD1 is connected to one end of the capacitor C5. The other end of the capacitor C5 is grounded. The tap position signal M is transmitted to the one end of the capacitor C5 through the diode D1. The capacitor C1 and the resistor R2 are connected in parallel. One end of the parallel combination is connected to the output pin 3a of the optocoupler chip U10, and the other end of the parallel combination is grounded.

A magnitude of the first threshold voltage U1 is determined by the resistor R3 and the voltage regulator ZD1. When the diode D1 receives the tap position signal M, the capacitor C5 is charged. When the terminal voltage of the capacitor C5 exceeds the first threshold voltage U1, the transistor Q1 switches on, so that a connection among the first input pin 1a of the optocoupler chip U10, the second input pin 2a of the optocoupler chip U10, and the transistor Q1 is established, allowing the optocoupler chip U10 to output the level signal IO-a at high state. When the terminal voltage of the capacitor C5 is lower than the first threshold voltage U1, the transistor Q1 switches off, and no connection is established among the first input pin 1a of the optocoupler chip U10, the second input pin 2a of the optocoupler chip U10, and the transistor Q1; as a result, the optocoupler chip U10 outputs the level signal IO-a at low state.

The second signal input circuit for motor stop comprises a resistor R10, a capacitor C6, a diode D3, a voltage regulator ZD2, a transistor Q2, an optocoupler chip U20, a capacitor C3, and a resistor R9. The tap position signal M is transmitted to the first input pin 1b of the optocoupler chip U20. The transistor Q2 comprises a collector, an emitter, and a base. The collector of the transistor Q2 is connected to the second input pin 2b of the optocoupler chip U20, and the emitter of the transistor Q2 is grounded. One end of the resistor R10 is in series with one end of the voltage regulator ZD2, and the other end of the voltage regulator ZD2 is connected to the base of the transistor Q2. The other end of the resistor R10 is connected to one end of the capacitor C6, and the other end of the capacitor C6 is grounded. The tap position signal M is transmitted to the one end of the capacitor C6 through the diode D3. The capacitor C3 and the resistor R9 are connected in parallel. One end of the parallel combination is connected to the output pin 3b of the optocoupler chip U20, and the other end of the parallel combination is grounded.

The magnitude of the second threshold voltage U2 is determined by the resistor R10 and the voltage regulator ZD2. When the diode D3 receives the tap position signal M, the capacitor C6 is charged. When the terminal voltage of the capacitor C6 exceeds the second threshold voltage U2, the transistor Q2 switches on, so that a connection among the first input pin 1b of the optocoupler chip U20, the second input pin 2b of the optocoupler chip U20, and the transistor Q2 is established, allowing the optocoupler chip U20 to output the level signal IO-b at high state. When the terminal voltage of the capacitor C6 is lower than the second threshold voltage U2, the transistor Q2 switches off, and no connection is established among the first input pin 1b of the optocoupler chip U20, the second input pin 2b of the optocoupler chip U20, and the transistor Q2; as a result, the optocoupler chip U20 outputs the level signal IO-b at low state.

The first threshold voltage U1 is greater than the second threshold voltage U2.

The working principle of the motor controller is as follows: each tap position signal M is split and input into one of the first signal input circuits for motor start and one of the second signal input circuits for motor stop. Subsequently, the first signal input circuit for motor start and the second signal input circuit for motor stop output two level signals, IO-a and IO-b, respectively. The first signal input circuit for motor start has a first threshold voltage U1, and the second signal input circuit for motor stop has a second threshold voltage U2. A potential difference is present between the first threshold voltage U1 and the second threshold voltage U2. The MCU controls the start or stop state of the motor based on the values of the two level signals, IO-a and IO-b. Due to a hysteresis potential difference between the first threshold voltage U1 and U2, a hysteresis voltage is present for switching the motor between ON and OFF states, thereby enhancing the anti-interference capability of the motor controller.

The MCU monitors the level status of two IO ports corresponding to each tap position signal, so as to determine a voltage range within which the actual voltage value of each tap position signal falls. The monitoring process allows for precise control of the motor controller, ensuring accurate starting and stopping at a voltage threshold. As a result, the overall reliability of the motor controller is improved.

Figure 5:
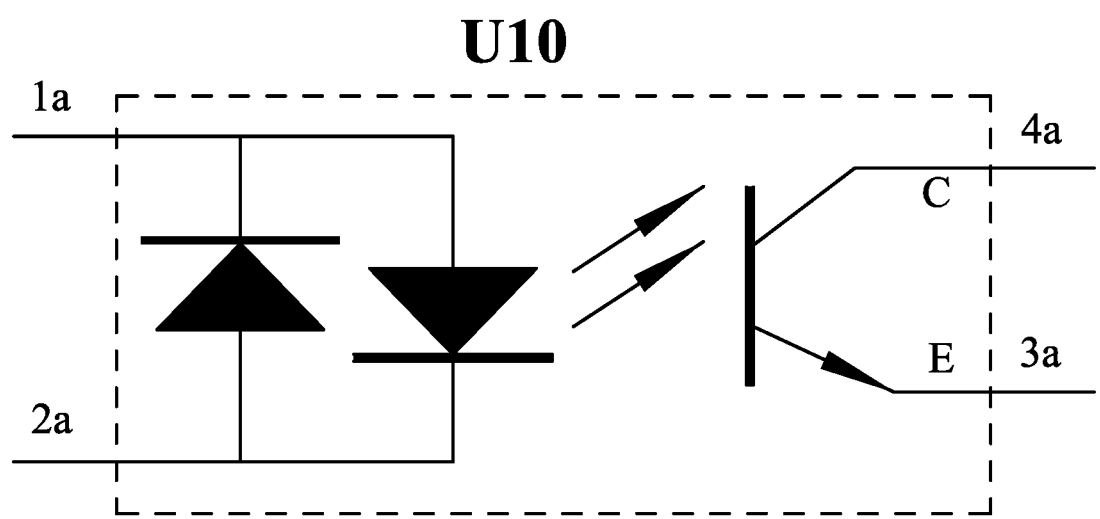
FIG. 5 is a circuit diagram of an optocoupler chip in FIG. 4.

The optocoupler chip U20 has the same structure as the optocoupler chip U10, as shown in FIG. 5.

Example 2

Figure 2:
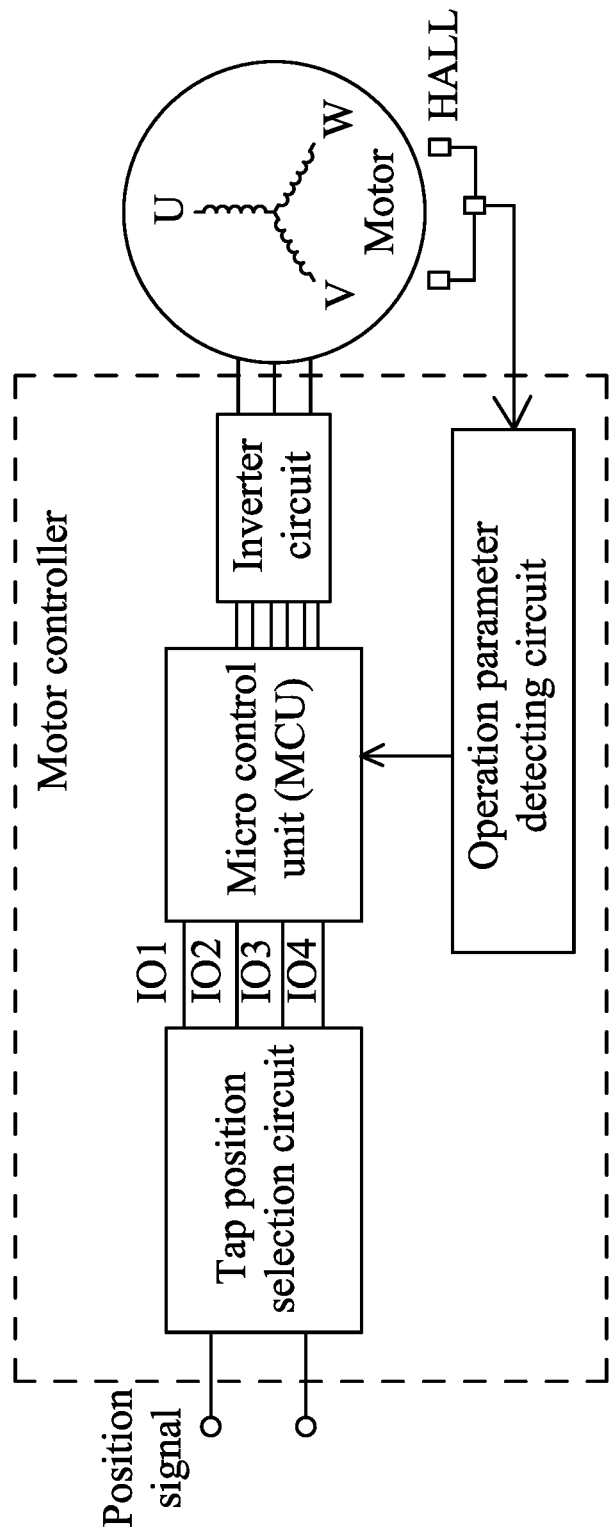
FIG. 2 is a block diagram of a principle according to Example 1 of the disclosure.
Figure 3:
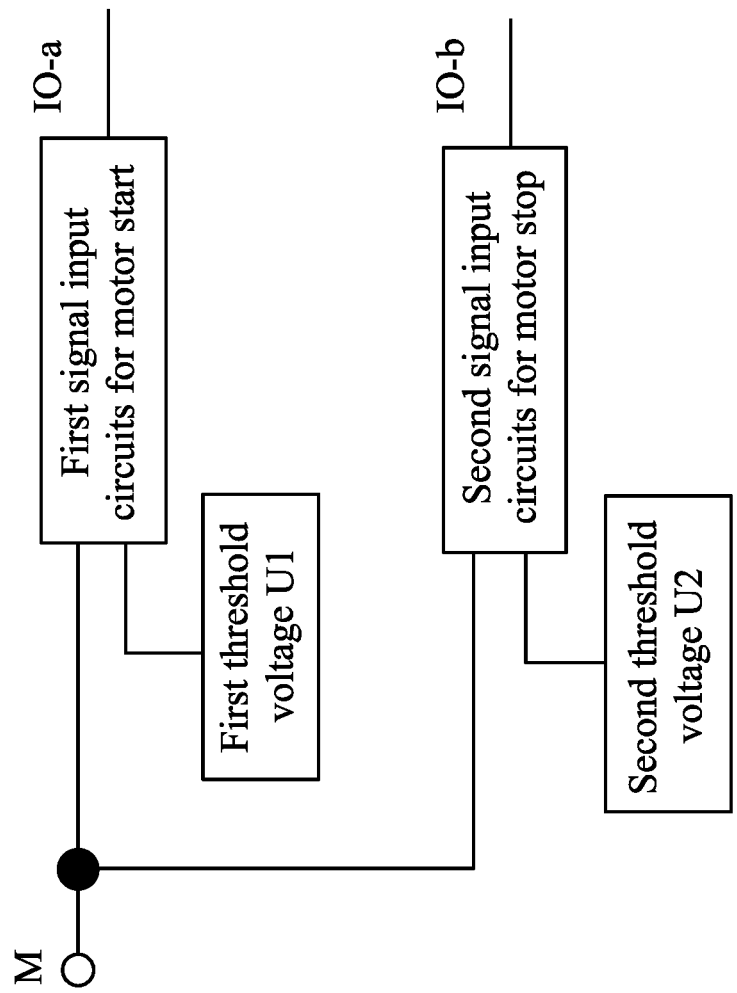
FIG. 3 is a block diagram of a tap position selection circuit applied with one tap position signal according to Example 1 of the disclosure.
Figure 4:
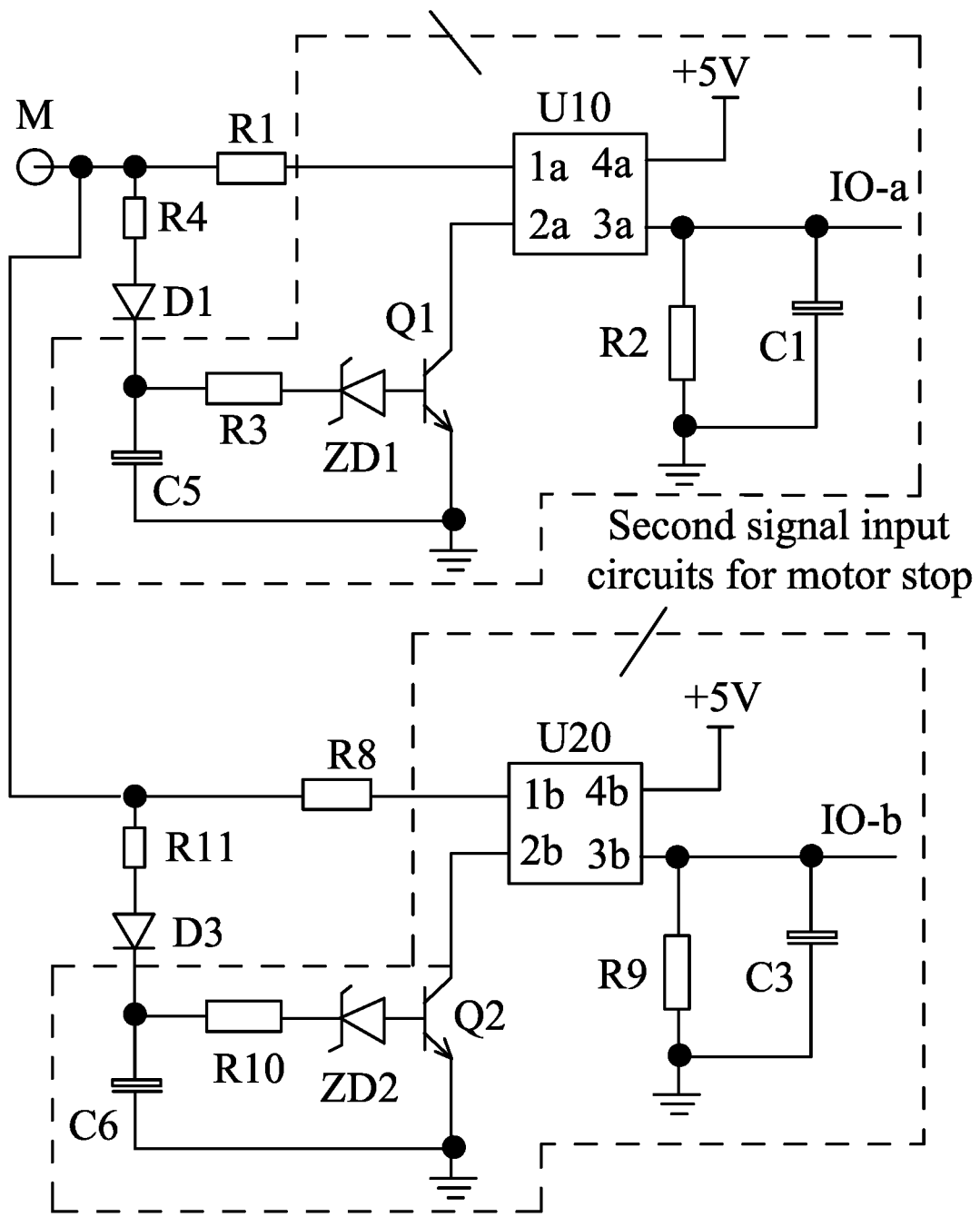
FIG. 4 is a circuit diagram corresponding to the tap position selection circuit FIG. 3.
Figure 6:
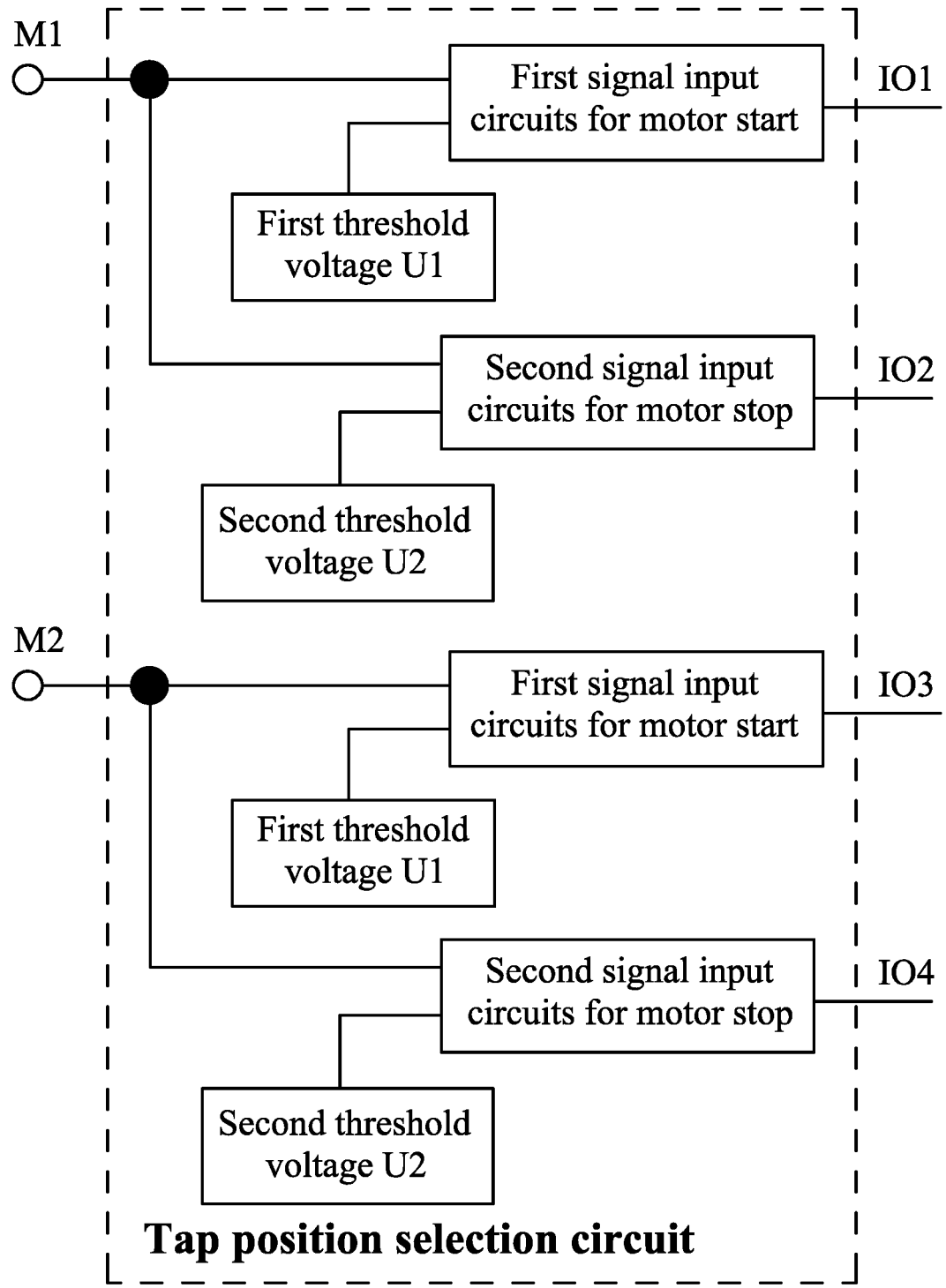
FIG. 6 is a circuit block diagram according to Example 2 of the disclosure.

The second example of the monitor controller is an improvement based one Example 1. As shown in FIGS. 2 and 6, the tap position signals comprise two tap position signals, M1 and M2. The tap position selection circuit comprises two first signal input circuits for motor start and two second signal input circuits for motor stop.

The tap position signal M1 is applied to one of the two first signal input circuits for motor start and one of the second signal input circuits for motor stop. Subsequently, the first signal input circuit for motor start and the second signal input circuit for motor stop output two level signals, IO1 and IO2, respectively, to two I/O ports of the MCU.

Similarly, the tap position signal M2 is applied to another first signal input circuit for motor start and another second signal input circuit for motor stop. Subsequently, the another first signal input circuit for motor start and the another second signal input circuit for motor stop output two level signals, IO3 and IO4, respectively, to another two I/O ports of the MCU. Precise start and stop operations of the motor can be achieved by using a truth table in logic as Table 1.

TABLE 1

| Tap position signal status | Level status of level signal IO1 | Level status of level signal IO2 | Level status of level signal IO3 | Level status of level signal IO4 | Voltage range |
|---|---|---|---|---|---|
| Operation of tap position signal M1 | High level | High level | Low level | Low level | Greater than 12 VAC |
| Operation of tap position signal M2 | Low level | Low level | High level | High level | Greater than 12 VAC |
| Cessation of tap position signal M1 | Low level or high level | Low level | Low level | Low level | Less than 6 VAC |
| Cessation of | Low level | Low level | Low level or | Low level | Less than 6 |

TABLE 1-continued

| Tap position signal status | Level status of level signal IO1 | Level status of level signal IO2 | Level status of level signal IO3 | Level status of level signal IO4 | Voltage range |
|---|---|---|---|---|---|
| tap position signal M2 | | | high level | | VAC |

The logical table for the two tap position signals, M1 and M2, is described as follows: when the tap position signal M1 is greater than 12 VAC, both the level signals IO1 and IO2 are high-level; when the tap position signal M1 is less than 6 VAC, both the level signals IO1 and IO2 are low-level; when the tap position signal M2 is greater than 12 VAC, both the level signals IO3 and IO4 are high-level; when the tap position signal M2 is less than 6 VAC, both the level signals IO3 and IO4 are low-level.

1. When both the level signals IO1 and IO2 are high-level, the MCU recognizes that the actual voltage of the tap position signal M1 is above 12 VAC (i.e., threshold voltage U1), indicating the activation of the tap position signal M1.

2. When both the level signals IO1 and IO2 are low-level, the MCU recognizes that the actual voltage of the tap position signal M1 is below 6 VAC (i.e., the second threshold voltage U2), indicating the deactivation of the tap position signal M1.

3. When the level signal IO1 is high-level and the level signal IO2 is low-level, the MCU recognizes that the actual voltage of the tap position signal M1 is between 6-12 VAC, indicating the deactivation of the tap position signal M1.

4. When the level signal IO1 is low-level and the level signal IO2 is high-level, the condition is considered invalid.

5. When both the level signals IO3 and IO4 are high-level, the MCU recognizes that the actual voltage of the tap position signal M2 is above 12 VAC, indicating the activation of the tap position signal M2.

6. When both the level signals IO3 and IO4 are low-level, the MCU recognizes that the actual voltage of the tap position signal M2 is below 6 VAC, indicating the deactivation of the tap position signal M2.

7. When the level signal IO3 is high-level and the level signal IO4 is low-level, the MCU recognizes that the actual voltage of the tap position signal M2 is between 6-12 VAC, indicating the deactivation of the tap position signal M2.

8. When the level signal IO3 is low-level and the level signal IO4 is high-level, the condition is considered invalid.

Example 3

The example provides a brushless direct current (BLDC) motor; the BLDC motor comprises a motor and the motor controller; the motor comprises a stator, a rotor, and a housing; and the motor controller is one of the motor controllers described in Examples 1-2.

It will be obvious to those skilled in the art that changes and modifications may be made, and therefore, the aim in the appended claims is to cover all such changes and modifications.

What is claimed is:

1. A motor controller, comprising: a tap position selection circuit, a micro control unit (MCU), and an inverter circuit; wherein:

the tap position selection circuit is configured to process a plurality of tap position signals transmit processed tap position signals to the MCU;

the MCU is configured to output signals to control the operation of the inverter circuit;

the inverter circuit comprises an output terminal connected to a plurality of coil windings of a stator module of a motor;

the tap position selection circuit comprises a plurality of first signal input circuits for motor start and a plurality of second signal input circuits for motor stop;

each tap position signal M is split into a first part and a second part; the first part is input into one first signal input circuit for motor start and the second part is input into one second signal input circuit for motor stop; and the first signal input circuit for motor start and the second signal input circuit for motor stop output two level signals, IO-a and IO-b, respectively, to the MCU, and the MCU controls a start or stop state of the motor based on a magnitude of the two level signals, IO-a and IO-b.

2. The motor controller of claim 1, wherein the first signal input circuit for motor start has a first threshold voltage U1, and the second signal input circuit for motor stop has a second threshold voltage U2; a potential difference is present between the first threshold voltage U1 and the second threshold voltage U2; when a voltage of the tap position signal M is greater than the first threshold voltage U1, the level signal IO-a is high-level; when the voltage of the tap position signal M is less than the first threshold voltage U1, the level signal IO-a is low-level; similarly, when the voltage of the tap position signal M is greater than the second threshold voltage U2, the level signal IO-b is high-level, and when the voltage value of the tap position signal M is less than the second threshold voltage U2, the level signal IO-b is low-level.

3. The motor controller of claim 2, wherein the first signal input circuit for motor start comprises a resistor R3, a capacitor C5, a diode D1, a voltage regulator ZD1, a transistor Q1, an optocoupler chip U10, a capacitor C1, and a resistor R2; the tap position signal M is transmitted to a first input pin 1a of the optocoupler chip U10; the transistor Q1 comprises a first collector, a first emitter, and a first base; the first collector of the transistor Q1 is connected to a second input pin 2a of the optocoupler chip U10, and the first emitter of the transistor Q1 is grounded; one end of the resistor R3 is in series with one end of the voltage regulator ZD1, and the other end of the voltage regulator ZD1 is connected to the first base of the transistor Q1; the other end of the resistor R3 is in series with one end of the voltage regulator ZD1, and the other end of the voltage regulator ZD1 is connected to one end of the capacitor C5; the other end of the capacitor C5 is grounded; the tap position signal M is transmitted to the one end of the capacitor C5 through the diode D1; the capacitor C1 and the resistor R2 are connected in parallel; one end of a parallel combination of the capacitor C1 and the resistor R2 is connected to an output pin 3a of the optocoupler chip U10, and the other end of the parallel combination is grounded.

4. The motor controller of claim 3, wherein a magnitude of the first threshold voltage U1 is determined by the resistor R3 and the voltage regulator ZD1; when the diode D1 receives the tap position signal M, the capacitor C5 is charged; when a terminal voltage of the capacitor C5 exceeds the first threshold voltage U1, the transistor Q1 switches on, so that a connection among the first input pin 1a of the optocoupler chip U10, the second input pin 2a of the optocoupler chip U10, and the transistor Q1 is established, allowing the optocoupler chip U10 to output the level signal IO-a at high state; when the terminal voltage of the capacitor C5 is lower than the first threshold voltage U1, the transistor Q1 switches off, and no connection is established among the first input pin 1a of the optocoupler chip U10, the second input pin 2a of the optocoupler chip U10, and the transistor Q1; as a result, the optocoupler chip U10 outputs the level signal IO-a at low state.

5. The motor controller of claim 4, wherein the second signal input circuit for motor stop comprises a resistor R10, a capacitor C6, a diode D3, a voltage regulator ZD2, a transistor Q2, an optocoupler chip U20, a capacitor C3, and a resistor R9; the tap position signal M is transmitted to the first input pin 1b of the optocoupler chip U20; the transistor Q2 comprises a second collector, a second emitter, and a second base; the second collector of the transistor Q2 is connected to the second input pin 2b of the optocoupler chip U20, and the second emitter of the transistor Q2 is grounded; one end of the resistor R10 is in series with one end of the voltage regulator ZD2, and the other end of the voltage regulator ZD2 is connected to the second base of the transistor Q2; the other end of the resistor R10 is connected to one end of the capacitor C6, and the other end of the capacitor C6 is grounded; the tap position signal M is transmitted to the one end of the capacitor C6 through the diode D3; the capacitor C3 and the resistor R9 are connected in parallel; one end of the parallel combination is connected to the output pin 3b of the optocoupler chip U20, and the other end of the parallel combination is grounded.

6. The motor controller of claim 5, wherein a magnitude of the second threshold voltage U2 is determined by the resistor R10 and the voltage regulator ZD2; when the diode D3 receives the tap position signal M, the capacitor C6 is charged; when a terminal voltage of the capacitor C6 exceeds the second threshold voltage U2, the transistor Q2 switches on, so that a connection among the first input pin 1b of the optocoupler chip U20, the second input pin 2b of the optocoupler chip U20, and the transistor Q2 is established, allowing the optocoupler chip U20 to output the level signal IO-b at high state; when the terminal voltage of the capacitor C6 is lower than the second threshold voltage U2, the transistor Q2 switches off, and no connection is established among the first input pin 1b of the optocoupler chip U20, the second input pin 2b of the optocoupler chip U20, and the transistor Q2; as a result, the optocoupler chip U20 outputs the level signal IO-b at low state.

7. The motor controller of claim 6, wherein the first threshold voltage U1 is greater than the second threshold voltage U2.

8. The motor controller of claim 7, wherein the plurality of tap position signals comprise two tap position signals, M1 and M2.

9. A brushless direct current (BLDC) motor, comprising a motor and the motor controller of claim 1, and the motor comprising a stator, a rotor, and a housing.

* * * * *